United States Patent
McBratnie

[15] 3,690,020
[45] Sept. 12, 1972

[54] INSTRUCTIONAL DEVICE FOR CHILDREN WITH LEARNING DISABILITIES

[72] Inventor: Karen Ann McBratnie, Portage, Mich.

[73] Assignee: Gordon W. Hueschen, Kalamazoo, Mich.

[22] Filed: Dec. 15, 1969

[21] Appl. No.: 885,211

[52] U.S. Cl. .................................. 35/37, 35/22 R
[51] Int. Cl. ........................................... G09b 11/04
[58] Field of Search ............... 35/36, 37, 22 R, 35 C; 273/1 E

[56] References Cited

UNITED STATES PATENTS

| | | |
|---|---|---|
| 3,348,844 | 10/1967 | Lemelson..............273/1 E X |
| 3,562,927 | 2/1971 | Moskowitz.................35/22 R |
| 1,887,160 | 11/1932 | Lorber..........................35/37 |
| 1,103,369 | 7/1914 | Montessori ............35/36 UX |
| 2,808,263 | 10/1957 | Goldfinger et al. ........35/22 X |
| 3,029,526 | 4/1962 | Olalainty......................35/22 |
| 3,073,041 | 1/1963 | Haban........................35/35 C |

FOREIGN PATENTS OR APPLICATIONS

| | | |
|---|---|---|
| 134,821 | 2/1920 | Great Britain.................35/22 |

*Primary Examiner*—Wm. H. Grieb
*Attorney*—Gordon W. Hueschen and Talivaldis Cepuritis

[57] ABSTRACT

An educational device is provided for training children, especially children with learning disabilities, e.g., brain-injured children, to trace indicia such as forms, patterns, letters, numbers, and parts thereof, thereby assisting the child in learning to write and in how to go about learning to write. The indicia may be present on or in a surface in the form of an electrically conductive medium, e.g., a metal or metallic form, against a nonconductive background. The indicia may be traced by means of a stylus held by the child and associated with a sound source so that, as long as the stylus remains in contact with the indicia, a desired condition prevails, e.g., pleasant music is heard by the child. The educational device suitably comprises a stylus, a circuit board, a means for providing a reinforcing stimulus, such as a sound generating means and associated transducer means, and associated wiring, in which at least the circuit board bearing the educational indicia and the means for providing said reinforcing stimulus are electrically connected in such a manner that contact between the tip of said stylus and said indicia results in the production of said reinforcing stimulus indicating proper tracing of the educational indicia on said circuit board and whereby placement of said stylus out of contact with said indicia defeats said reinforcing stimulus, thereby indicating improper tracing, especially such a device comprising also a deskette having a recess for said circuit board and contact means for establishing electrical connection with the circuit board, and such combination of circuit board and deskette.

15 Claims, 5 Drawing Figures

PATENTED SEP 12 1972 3,690,020

INVENTOR.
Karen Ann McBratnie

BY
Gordon H. Luescher
ATTORNEY

INSTRUCTIONAL DEVICE FOR CHILDREN WITH LEARNING DISABILITIES

BACKGROUND OF INVENTION

The education of children with learning disabilities has in recent years become an important part of the total educational picture. For example, it has been recognized that although brain-injured children can generally never assume a position entirely equal to that which can be attained by a normal individual, a brain-injured individual can be trained and educated sufficiently so that he can assume an important position in our society and become self sufficient.

The education of children with such learning disabilities is at best a difficult task. However, modern psychology, technology, and teaching materials have greatly assisted the teacher in the education of such children, and provided teaching approaches which have up to the present had a certain limited degree of success. Nevertheless, it is apparent that, in this particular field of education, the materials and educational devices available up to the present leave much to be desired, and improved materials and devices for use in this educational area are of great interest to the dedicated special education segment of the teaching profession.

The device of the present invention admirably fulfills this critical need. Although designed primarily for classroom use in the instruction of writing, especially cursive handwriting, skills and/or as a remedial training device for writing, especially cursive handwriting, perfection, it is applicable not only in the regular classroom situation but also in the special classroom setting for educable mentally retarded children, and is especially suitable and specifically applicable in training of children with learning disabilities, e.g., the brain-injured, perceptually handicapped, hyperactive child.

While instructing the child in writing, especially cursive handwriting, techniques, several other objectives of a psychological and physiological nature are accomplished through the employment of the device of the present invention. Included are the following: (1) eye/hand coordination, (2) seeing "forms" as a whole, (3) large and small muscle development, (4) establishing handedness, (5) concept of spatial relationships, (6) left-to-right progression, (7) total involvement in task at hand, (8) form discrimination, (9) increased attention span, (10) control and limitation of perseveration, (11) size discrimination, (12) classification and grouping, (13) lessening of distractability, (14) channeling of symptomatic behavior to a constructive end, (15) offers immediate reinforcement, (16) requires small amount of teacher direction, (17) requires no specific amount of time for use, and (18) multisensory instruction.

Employment in the device of the invention of cursive handwriting forms or portions or extensions thereof is preferred over the employment of other types of forms, inasmuch as instruction in cursive handwriting skills, rather than in the traditional manuscript, is advocated by specialists in the field of learning disabilities for numerous reasons.

Cruickshank and his coauthors [Cruickshank, Bentzen, Ratzeburg, and Tannhauser, "A Teaching Method for Brain-Injured and Hyperactive Children", (1963)] state at page 192:

". . . cursive writing should be taught because the child uses a continuous flowing motion which carries him on by its own momentum. Cursive writing helps his disorganized, uncoordinated movements to fall into a coherent pattern. Letters flow into each other, and this fact reduces sensitivity to the external distractions of the noncontinuous motions and the disconnected letters of manuscript. Further, words are written as connected wholes; consequently improper connections are not the problem as they often are in manuscript."

"The connections between letters in cursive writing also help to emphasize left-to-right progression. Cursive letters, moreover, are not subject to reversals (compare "b" and "d" printed with "b" and "d" cursive); and, finally, if the child is taught the new skill of cursive writing, there is no need for the teacher to correct the errors that may have developed in his wrongly formed manuscript."

Strauss and Lehtinen similarly agree with Cruickshank and his coauthors. Strauss and Lehtinen, "Psychopathology and Education of the Brain-Injured Child", (1962), state:

"The perceptual disturbances of the brain-injured child act as a definite handicap in acceptably spacing letters and words. Perception of a word form as a unified whole is aided when the letters of the word are actually joined to form a whole. Connected or cursive writing also seems to lend itself more effectively to developing a kinesthetic perception of word forms."

Regarding the educational program suggested for the brain-injured, hyperactive child, Cruickshank and his coauthors offer the reader additional insight into the value and types of teaching materials and devices which can be beneficial to the brain-injured child:

"The teacher tries to provide motor activity which engages the child directly in his task and which fixes his attention on the process involved. She tries to create materials that are self-tutoring, so that the child is helped to become independent of the teacher. She designs materials that are free of unnecessary detail, that do not distract the child, and that enable him to focus his attention on the task at hand. For example, she uses only simple forms. The child is to think of color or form and is not distracted by cats, trees or rabbits."

Cruickshank et al. further hypothesize that: ". . . if hyperactive children are distracted to stimuli then their attention can be drawn to stimuli which are purposely organized and specifically placed within their visual field."

The device of the present invention "teaches to the disability" of the brain-injured child, channeling the symptom behavior to a constructive end while helping to develop the deficient perceptual disabilities.

To achieve the objectives of the invention most fully, a thorough analysis of the alphabet has been made by the present inventor, along with a determination of what forms are duplicated, and to what extent duplicated forms are used in the execution of cursive handwriting. A method has then been devised by the present inventor whereby the student can be made aware of the construction of the cursive alphabet. If a child is able to understand the construction of a particular object, shape, or design he will then be better able to reproduce that object, shape or design. For example, if one draws a square on a chalk board and a child is unable to reproduce this shape on a piece of paper, a square can be drawn on the floor and the child requested to slide-step around that square. The child feels the continuous, non-stop motion of lines and connections being made through the continuous, non-stop movement of his slide-step, and thereby understands the nature of the design involved.

A total of eleven different forms were found by the present inventor to comprise the cursive alphabet. These eleven forms are joined in varying sequences to represent each letter of the cursive alphabet. When a child masters the movements required to make the 11 forms, he has little difficulty in the mastery of all 26 letters of the cursive alphabet.

It is on this basis and for the foregoing reasons, applications and objectives, that the device of the present invention is conceived by the inventor. However, it will be recognized that, although cursive writing and parts or extensions thereof are considered most advantageous as the forms to be used in the device of the invention, for tracing by the child, other forms, letters, numbers, patterns, and shapes, and parts thereof may also be employed, although with what is believed to be a lesser degree of effectiveness.

After the child has practiced tracing the indicia, he ultimately learns to recognize and to reproduce the indicia, as with paper and pencil, in the absence of the device. The device is thus at one time a tool for the development of manual competence, e.g., in cursive handwriting, and more efficient perceptual competence.

BRIEF DESCRIPTION AND OBJECTS OF INVENTION

It is an object of the present invention to provide a device whereby all of the foregoing educational objectives can be accomplished.

It is also an object to introduce improved motivational aspects into such education by means of advanced motivational teaching materials and devices.

It is another object to provide an educational device for use in the training of children, and particularly children with learning disabilities, adapted to facilitate their instruction in tracing various indicia such as forms, patterns, letters, numbers, and parts thereof, and in learning to write and how to go about learning to write through a better understanding of the concepts involved in writing, especially in cursive handwriting.

It is a further object to provide such a device which facilitates such training in that it creates favorable motivating conditions for enhancing and accelerating the learning process of such children.

A still further object is to assist the perceptual development of a child through provision of a device which employs auditory, visual, kinesthetic, and tactile motivations in the teaching of handwriting, especially cursive handwriting, and in the teaching of an understanding of the concepts of such handwriting through a stepwise exposure to the movements and forms involved therein.

Still an additional object is to provide an educational device of the type described which can be utilized for simultaneous instruction of a group of individuals.

Still a further object is to provide such an educational device which is relatively simple and inexpensive to produce and operate.

Another object is to provide a circuit board having a background and having educational indicia thereon and adapted to be traced, said educational indicia comprising a cursive alphabet sentence, word, letter, or letter part, or a precursive form, one of said background and said educational indicia being conductive and the other being non-conductive, and comprising a conductive area adapted to establish electrical contact between said circuit board and an electrical contact means for making said circuit board a part of an electrical circuit.

Another object is to provide a circuit board having educational indicia thereon wherein such educational indicia comprises a cursive alphabet sentence, word, letter, part thereof, or a precursive form.

Another object is to provide an educational device comprising a stylus, a circuit board, a means for providing a reinforcing stimulus, such as a sound generating means and associated transducer means, and associated wiring, in which at least the circuit board bearing the educational indicia and the means for providing said reinforcing stimulus are electrically connected in such a manner that contact between the tip of said stylus and said indicia results in the production of said reinforcing stimulus indicating proper tracing of the educational indicia on said circuit board and whereby placement of said stylus out of contact with said indicia defeats said reinforcing stimulus, thereby indicating improper tracing, especially such a device comprising also a deskette having a recess for said circuit board and contact means for establishing electrical connection with the circuit board, and such combination of circuit board and deskette.

Another object is the provision of a deskette having a recess and contact means, said recess being adapted to receive a circuit board bearing educational indicia thereon and suitable for tracing, and said contact means being adapted to establish electric contact with said circuit board, the circuit board itself, and the combination of the deskette with the circuit board in place thereon.

The foregoing and additional objects will become more fully apparent hereinafter, and still others will be apparent to one skilled in the art.

Accordingly, the present invention provides a deskette having a recess and contact means adapted to receive a circuit board bearing educational indicia thereon and establish electrical contact with said circuit board, and sound generating and transducer means, together with a stylus and appropriate wiring between at least the circuit board and the reinforcing stimulus providing means so that proper contact of the stylus with the indicia provides reinforcement and indicates proper tracing, whereas placement of the stylus out of contact with the indicia eliminates the reinforcement, at least as far as the child operating the device is concerned, thus indicating improper tracing. The reinforcing device is preferably music, and the educational indicia on the circuit board is preferably a cursive sentence, word, letter, part thereof, or a precursive form.

The following specific preferred embodiments are given by way of illustration only and are not to be construed as limiting.

DESCRIPTION OF THE PREFERRED EMBODIMENTS

Figure 1:
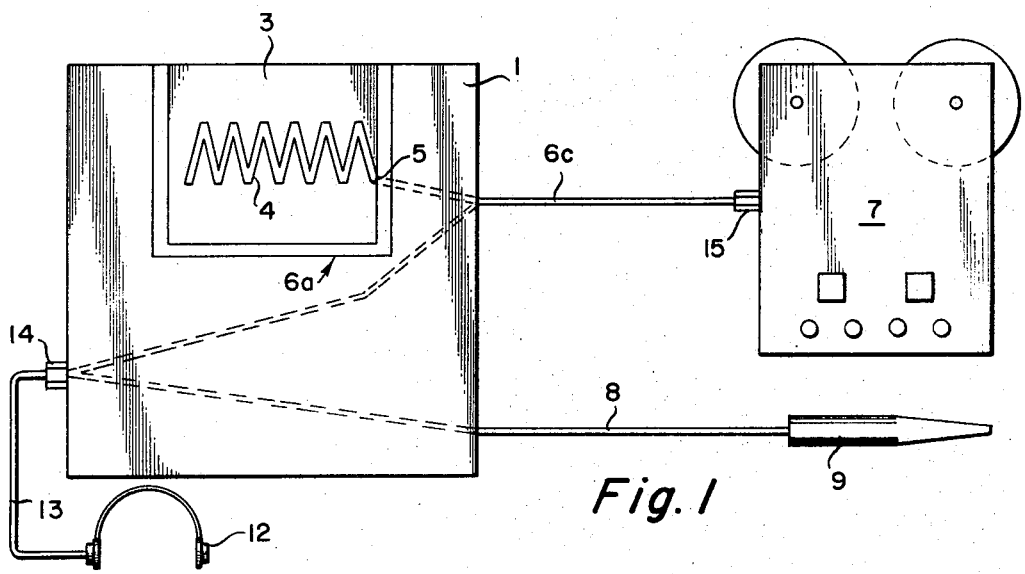
FIG. 1 is a plan view of an apparatus according to the invention, internal wiring being shown in dotted lines.
Figures 2, 3:
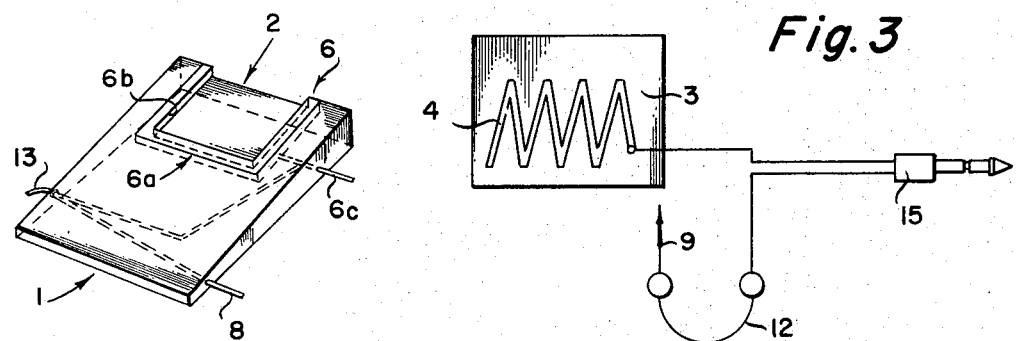
FIG. 2 is a perspective view of the base or deskette.
FIG. 3 is a schematic view of the circuit board, earphones, and stylus.

Referring to the drawings, FIG. 1 illustrates an educational device of the present invention which comprises a deskette or desk top 1 having a recess 2, as shown in FIG. 2, and a circuit board 3, having indicia 4 thereon, in this case in the form of a series of cursive letter "1's." The circuit board 3 may be formed of wood, plastic material, hard rubber, or any other suitable nonconductive material. The indicia 4 may be of any suitable conductive material such as metal foil, especially copper, lead, silver, or aluminum. It may be applied to the circuit board 3 by an adhesive or other suitable means and preferably should be recessed or so adhered that its outer surface is flush or substantially flush with the surface of the circuit board 3.

The indicia 4 is conveniently connected at its right extremity 5 to an electrical contact frame 6 which, in turn, is connected to one output terminal of an electric signal source or generator, such as a tape recorder 7, by means of a suitable lead in electrical cord 6c and jack 15. Other connecting means for indicia 4 such as surface contacts may be employed. The connecting means need only be associated with the deskette 1 and need not be permanently connected or affixed thereto.

Optionally, the deskette 1 can be provided with horizontal flange 6a and vertical flange 6b as shown in FIG. 2 to assist in retaining circuit board 3 in place during use.

The other output terminal of tape recorder 7 is connected by means of suitable leads in electrical cord 6c, cord 13, and cord 8 in series with earphones 12 or a similar transducer means, and with conductive stylus 9 so that the output circuit of tape recorder 7 is completed when stylus 9 electrically contacts indicia 4. The earphones 12 are removably connected in the circuit by jack 14 which is situated on one side of deskette 1.

Figure 5:
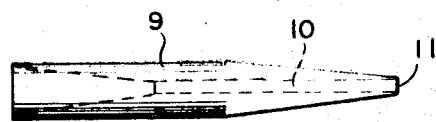
FIG. 5 is a plan view of a stylus.

As shown in FIG. 5, stylus 9 is provided with an axial conductor 10 terminating in a conductive tracing tip 11 and adapted for electrical connection to a lead in cord 8.

The internal wiring shown in dotted lines in FIG. 1 (and, in fact, the external wiring as well, to the extent possible) may be and preferably is integral and without jacks or plugs, especially such jacks or plugs as are externally detachable from the working elements, e.g., the deskette proper, to prevent accidental or intentional removal by the child employing the device.

A schematic electrical diagram of the circuit of an educational device of the invention, in single unit form, is illustrated in FIG. 3.

In operation, a circuit board 3 bearing the desired indicia 4 is placed in recess 2 of deskette 1 and electrically connected to the electrical contact frame 6. The device is connected, as by cord 6c and jack 15, to an electrical sound source such as tape recorder 7, which is programmed to produce a sound or music of a type which will predictably have a favorable motivating effect on the subject. The earphones 12 are plugged into deskette 1 by means of cord 13 and plug 14 and placed over the ears of the subject. The subject is then handed stylus 9 and instructed to trace the indicia 4 throughout its length. Since the stylus 9 and indicia 4 are in series with the electrical circuit, the desired music or other reinforcing sound will be heard in the earphones 12 as long as the stylus 9 makes contact with indicia 4. When the stylus tip 11 is removed from the indicia 4, the sound ceases to be heard. This indicates to the subject that he is not tracing properly and he then returns the stylus to the indicia, whereupon the desired sound is again heard. After a suitable period of practice in tracing the indicia, the subject learns to recognize the indicia and to write it out on a piece of paper with a pencil or pen.

In addition, by exposure of the subject to simpler forms or parts of forms, such as portions of cursive letters and the like, and by increasing the complexity of the forms to be traced including the combination of parts of letters once learned into complete letters, and then the combination of letters, once learned, into combinations of letters, and ultimately the combination of already learned words into sentences, the subject can also be caused to gain a comprehension of the basics and concepts involved in writing as well as the auditory, visual, kinesthetic, and tactile coordination attained through such a constantly advancing learning process. In a preferred embodiment, the forms not only include combinations of letters to form words and sentences, but also diminution of the thickness of the indicia to be traced on the circuit board as the subject advances and gains confidence and competence. The overall result of this program of education or training, advancing from the most elementary forms through the most advanced forms, and involving as it does on the order of eight (80) forms of a constantly advancing nature, is the perceptual development of the subject along the lines previously set forth and including at least all of the eighteen specific developmental advantages already enumerated.

The following chart illustrates the eleven basic cursive forms, as identified by the present inventor, and the part each plays in the formation of the cursive alphabet. These forms are, as will be recognized, parts or portions of cursive letters.

The forms are as follows:

| Cursive Letters: | Required Forms: | Cursive Letters | Required Forms: |
|---|---|---|---|
| a | 5,2 | n | 1 |
| b | 3,6 | o | 5,6 |
| c | 5 | p | 2,7,8 |
| d | 5,3 | q | 5,10 |
| e | 3 | r | 6 |
| f | 3,10 | s | 4 |
| g | 5,7 | t | 2 |
| h | 3,1 | u | 1,2 |
| i | 2 | v | 1,6 |
| j | 2,7 | w | 1,2,6 |
| k | 3,11 | x | 1 |
| l | 3 | y | 1,2,7 |
| m | 1 | z | 1,9 |

In addition to basic cursive forms, of which there are eleven, precursive movements are advantageously included in the above-mentioned program of learning advancement, even prior to instruction in the basic, but yet more sophisticated, cursive forms. Precursive movements can be defined as those movements indirectly related to the cursive forms, on a much less sophisticated level. The precursive movements advantageously included are designed to give the student:

1. An opportunity to become acquainted with the device.
2. A basic understanding of the continuous flowing motion of cursive handwriting.
3. A type of "warm-up" exercise.

Exemplary precursive handwriting movements which can advantageously be employed may be illustrated as follows:

1.    2. 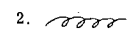   3.    4. 

The multi-sensory teaching device of the invention is most advantageously employed for teaching the precursive movements and basic cursive forms in five developmental stages. The precursive movements, the basic cursive forms, and eventually letters, words, and sentences, are placed onto circuit boards. As the child traces over the forms with a stylus, a continuous positive reinforcement, as by the playing of soft music, is heard through the earphones he is wearing. Incorrect movements made by the child will elicit a negative reinforcement, e.g., the music is immediately discontinued. This auditory feed-back helps to focus the child's attention on the task at hand and serves as a sensory guide to desired movement. For the child, the reinforcement, e.g., the soft music, appears to be magically controlled by his ability to move correctly through one stage of development to the next. Hence, the device of the invention can become a pleasurable tool for the self-instruction of cursive handwriting and the development of more efficient perceptual competence.

Although the present educational device has many uses in the instructional and educational field, it is primarily designed for use in training children to recognize forms, such as letters, parts thereof, and the like, as previously enumerated, and to trace them by applying the proper motivational stimulus when the tracing is being done properly.

Figure 4:
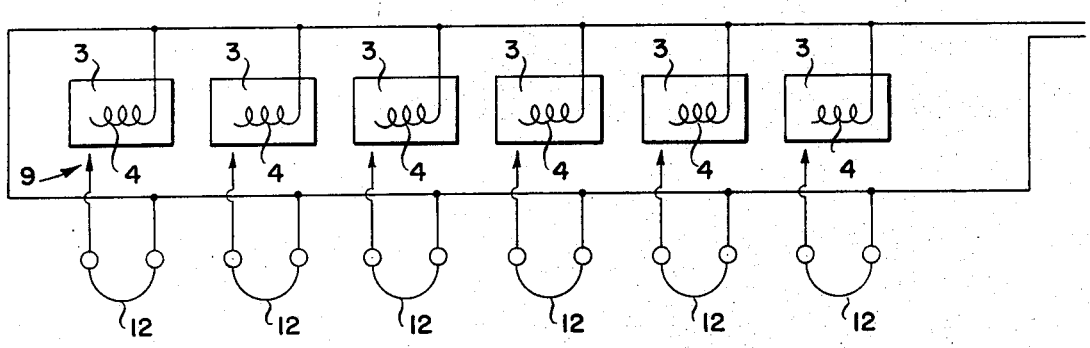
FIG. 4 is a schematic view of a plurality of units.

A plurality of devices may be connected to a single sound source, as shown in FIG. 4, in order to provide simultaneous instructions of a group of subjects. The operation is the same as when individual units are connected, each subject hearing the desired sound only when the tip of the stylus which he is operating is in contact with the indicia 4 of the circuit board 3 which has been inserted into his deskette 1, there being no interaction between the various units when they are properly connected, as shown. Such multiple arrangements are readily effected by using commercially available "listening center" multiple outlets served by a single sound signal generating means but into which a plurality of earphones (in this case, however, deskettes) can be plugged.

Although the characteristics of the components utilized in the present invention are not critical in value, better results will obviously be obtained when sound electrical engineering practice is observed. For example, earphones should be chosen having an impedance the same as or close to the impedance of the output of the electrical signal source, as for example, the tape recorder.

Although, in the foregoing, the electrical sound source has been described as a tape recorder, this may obviously be replaced by any suitable sound generating means, such as a phonograph, radio, a piped-in music outlet, or the like. Moreover, when the individual subjects in a multiple system are positioned in individual, e.g., sound proof cubicles, it is of course possible to employ a loud speaker of controlled or controllable volume instead of the previously described earphones. Other conventional transducer means can also be employed as will be apparent to one skilled in the art.

Although, in the foregoing, indicia 4 is described as a conductive material applied to circuit board 3 by an adhesive or other suitable means, it should be understood that the said circuit board bearing the said indicia in or on its surface may be prepared in any suitable manner and take any suitable form. For example, the circuit board may be produced by acid etching, by silk screening, by printing, by photographic processes, by electrostatic printing or painting, by vacuum metalizing, by flow coating, by hot stamping, by means of an electrostatic bath, or in any other suitable manner, as will be apparent to one skilled in the art. The indicia 4 need only be of any suitable conductive material, and the background of circuit board 3 of any suitable nonconductive material, or the reverse. In such reverse embodiments, it will be apparent that the indicia is of nonconductive material and that the background is of conductive material, and in such case, the indicia may advantageously be a plastic, wood, or the like, and the background may advantageously bear a coating of conductive material such as a metal foil or film. Such reverse arrangements are further considered hereinafter.

Although the present invention has been described particularly with relation to an embodiment utilizing electrically conductive indicia and electrically nonconductive background area on the circuit board 3, and utilizing a desirable signal for motivation reinforcement, other variations may be practiced within the principle of the invention. Thus, to place the invention in its broad aspect, it comprises providing visible indicia for the subject and a stylus for tracing the indicia. Additionally, a condition is established which is reinforcing or favorable when the stylus is in contact with the educational indicia and non-reinforcing or unfavorable when the stylus is not in contact with the indicia. This result may obviously be accomplished in several ways, which will be within the skill and comprehension of one skilled in the art perusing this disclosure. As shown in the drawings and described in the foregoing, one may utilize a sound which is reinforcing or desirable. Consequently, the remainder of the apparatus in such case is so designed that the sound will be heard only when the stylus is in contact with the indicia.

Alternatively, but less advantageously, a "sound of error" may be provided which is undesirable, that is, uncomfortable or unpleasant to hear, as for example a high pitched screech, static, or other undesirable noise.

In this case the circuit is designed so that contact between the stylus and the indicia disables the sound and causes reinforcing silence, the subject recognizing an error in tracing when the undesirable sound appears. Thus, in the embodiment particularly shown and described, the indicia is made conductive and the background nonconductive. In such arrangement the indicia and stylus are placed in series with the sound source and transducer, e.g., earphones, thereby defeating the sound when contact is lost between the indicia and stylus. Alternatively, the indicia can be nonconductive and the background conductive. Such an arrangement can conveniently be used in series connection so that the undesirable sound is audible when the stylus is in contact with the background and only reinforcing silence is experienced when the stylus is in contact with the indicia.

Alternative arrangements can also be used with desired sounds such as music contact with the background defeating the sound, as for example by shorting it out or opening a series circuit. As a further variation, conductive indicia can be used with an unpleasant or undesired sound, contact with the indicia defeating the sound by shorting it out in known manner to give reinforcing silence.

Other variations may also be employed. For example, an electronic contact switch may be used so that a finger of the subject's hand can be used in tracing the indicia (rather than a stylus), contact with the indicia closing an electronic switch and actuating the sound by completing the circuit providing the signal from the sound generating source. Metallic styli can also be used with this arrangement, no electrical connection being required, a switch for closing the circuit being actuated merely by the static discharge of the stylus.

As a further variation, particularly for training subjects highly sensitive to light stimuli or those having a hearing disability, a light may be used as a reinforcing stimulus, either alone or together with a sound reinforcing stimulus. Such a stimulus may be used in one of many ways, for example, by placing a light on the deskette, or by utilizing a lamp below a translucent or transparent circuit board or below a similar area of the top of the deskette, in particular a light so located and connected as to light up the indicia, as from below, so long as it is being properly traced. In practice, however, the reverberations or vibrations from a sound generating means are very often sufficient motivational reinforcers for a child with impaired hearing.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. An educational device for facilitating the development of perceptual manual competence through experience in the tracing of forms or patterns in coordination with an audible reinforcing stimulus-generating means, comprising the combination of:
    a. a circuit board having a background and visibly displayed indicia thereon adapted to be traced, said indicia being substantially flush with the surface of said board, one of said background and indicia being of conductive material and the other being of nonconductive material,
    b. a tracing stylus having a tip adapted to engage and to trace said indicia, and
    c. means for providing said audible reinforcing stimulus, at least (a) and (c) of said elements being connected electrically in such manner that contact between said stylus tip and said indicia results in the production of said reinforcing stimulus indicating proper tracing, and whereby placement of said stylus out of contact with said indicia defeats said reinforcing stimulus, thereby indicating improper tracing.

2. An educational device according to claim 1,
    a. said indicia on said circuit board is formed of an electrically conductive material,
    b. said tracing stylus has an electrically conductive tip and means for connecting said tip to an electrical circuit,
    c. said means (c) comprises transducer means for converting the electrical signal from said generating means to an audible sound signal,
    said indicia, said transducer means, and said stylus being so electrically connected that, when connected to said generating means, contact between said stylus tip and said indicia results in an audible sound signal.

3. An educational device according to claim 2, additionally including a desk top, said desk top being adapted to receive and retain said circuit board, said circuit board and said desk top having cooperating means for electrically connecting said indicia to the circuit of said educational device.

4. An educational device according to claim 2, wherein said transducer means is an earphone or loudspeaker.

5. An educational device according to claim 2, wherein said signal generating means is a tape recorder, phonograph, or radio.

6. An educational device according to claim 2, wherein said indicia is formed of metal sheet.

7. An educational device according to claim 2, wherein said circuit board is formed of a plastic material.

8. An educational device according to claim 2, wherein said indicia, said stylus, said transducer means, and said signal generating means are connected in series and form a complete circuit when said stylus tip is in contact with said indicia.

9. A plurality of educational devices according to claim 1 wherein:
    a. said indicia on said circuit board is formed of an electrically conductive material,
    b. said tracing stylus has an electrically conductive tip and means for connecting said tip to an electrical circuit,
    c. said means (c) is transducer means for converting the electrical signal from said generating means to an audible sound signal,
    said indicia, said transducer means, and said stylus being so electrically connected that, when connected to said generating means, contact between said stylus tip and said indicia results in a sound signal audible through said transducer means.

10. The device of claim 9, wherein the circuit boards and the transducer means are connected in series with the electrical sound signal generating means and said styli are connected in series with the transducer means and adapted to close a parallel circuit when contacted with the indicia.

11. A circuit board having a background and visibly displayed indicia thereon adapted to be traced, said indicia being substantially flush with the surface of said board, one of said background and indicia being of conductive material and the other being of nonconductive material, and comprising a conductive area adapted to establish electrical contact between said circuit board and an electrical contact means for making said circuit board a part of an electrical circuit, said indicia on said circuit board comprising a cursive alphabet sentence, word, or letter.

12. The circuit board of claim 11, wherein the educational indicia on said circuit board is conductive and said background is nonconductive.

13. A deskette, stylus, and sound signal generating means combination, said deskette having a recess and contact means, said recess receiving a circuit board having a background and visibly displayed indicia thereon adapted to be traced, said indicia being substantially flush with the surface of said board, one of said background and indicia being of conductive material and the other being of nonconductive material, and said contact means establishing electrical contact with said circuit board when in place in said recess; said deskette comprising a generally horizontal upwardly facing surface for facilitating writing or tracing thereon and support means for holding said circuit board in place with said educational indicia adapted for tracing facing upwardly and visibly, an electrically conductive stylus in combination therewith for tracing the educational indicia on said circuit board and ancillary wiring between said stylus, the contact means of said deskette, and the electrical sound signal generating means, so that tracing upon said educational indicia on said circuit board in place in said deskette by means of said stylus completes the circuit and produces sound signal indication that the actions of the operator of said stylus in tracing said educational indicia are correct.

14. A device of claim 13, including individual headphones for the operator of the stylus and operatively connected between said deskette unit and said electrical sound signal generating means.

15. A device of claim 13, wherein a listening-center multiple outlet is connected to said electrical sound signal generating means and wherein a plurality of deskette units are employed, each with its own set of headphones, individually operatively connected to said listening center multiple outlet.

* * * * *